United States Patent [19]

Dobrez et al.

[11] Patent Number: 4,980,075

[45] Date of Patent: Dec. 25, 1990

[54] COOLANT FILTER COMPOSITION

[75] Inventors: John F. Dobrez, Flossmoor; David Ganbarg, Chicago, both of Ill.

[73] Assignee: Dober Chemical Corporation, Midlothian, Ill.

[21] Appl. No.: 297,042

[22] Filed: Jan. 13, 1989

Related U.S. Application Data

[60] Division of Ser. No. 152,966, Feb. 8, 1988, Pat. No. 4,842,731, which is a continuation-in-part of Ser. No. 904,485, Sep. 9, 1986, abandoned.

[51] Int. Cl.$^5$ .................................................. C09K 5/00
[52] U.S. Cl. ........................................ 252/71; 252/73; 252/75
[58] Field of Search ...................... 252/73, 71, 75, 387

[56] References Cited

U.S. PATENT DOCUMENTS

| | | | |
|---|---|---|---|
| 2,119,566 | 5/1938 | Watts | 252/74 |
| 2,233,185 | 2/1941 | Smith | 252/76 |
| 3,231,501 | 1/1966 | Reese | 252/74 |
| 3,645,402 | 2/1972 | Alexander et al. | 210/266 |
| 3,962,109 | 6/1976 | Oberhofer et al. | 252/74 |
| 4,058,489 | 11/1977 | Hellsten | 252/8.75 |
| 4,203,864 | 5/1980 | Sawyer, Jr. | 252/314 |
| 4,242,214 | 12/1980 | Lambert, Jr. | 252/75 |
| 4,357,236 | 11/1982 | Krueger | 210/167 |
| 4,404,113 | 9/1983 | Peters et al. | 252/75 |
| 4,444,247 | 4/1984 | Franck et al. | 210/167 |
| 4,455,248 | 6/1984 | Wood | 252/75 |
| 4,482,467 | 11/1984 | Nakamura et al. | 252/70 |
| 4,508,684 | 4/1985 | Huff et al. | 252/75 |
| 4,587,028 | 5/1986 | Darden | 252/76 |
| 4,588,513 | 5/1986 | Triebel et al. | 252/75 |
| 4,655,930 | 4/1987 | Kuhn et al. | 210/167 |

FOREIGN PATENT DOCUMENTS

| | | |
|---|---|---|
| 3225852 | 1/1984 | Fed. Rep. of Germany. |
| 1385888 | 3/1975 | United Kingdom. |
| 1463401 | 2/1977 | United Kingdom. |

*Primary Examiner*—Prince E. Willis
*Assistant Examiner*—Christine A. Skane
*Attorney, Agent, or Firm*—Frank J. Uxa, Jr.

[57] ABSTRACT

In a method for manufacturing a circulating coolant system filter which includes a filter medium and a space into which a supplemental coolant additive can be placed to provide at least one beneficial property to the circulating coolant, the improvement comprising: automatically introducing the supplemental coolant additive into the space in the form of a liquid-powdered solids slurry.

8 Claims, No Drawings

COOLANT FILTER COMPOSITION

This application is a division of application Ser. No. 152,966, filed Feb. 8, 1988, U.S. Pat. No. 4,842,731, which is a continuation-in-part of co-pending application Ser. No. 904,485, filed Sept. 9, 1986, now abandoned.

This invention relates to an improved method for manufacturing a circulating coolant system filter and to a composition useful in such improved method. More particularly, the invention relates to manufacturing such a filter which includes a filter medium and a space for a supplemental additive package to improve the properties of the circulating coolant.

Coolants are often needed in industry, e.g., in stationary and vehicular engines, to maintain the system temperature suitable for effective operation. Frequently, such coolants, often liquid coolants, circulate over a long period of time through the system, e.g., internal combustion engines such as diesel engines spark ignited engines and the like, the temperature of which is to be maintained. Such long term use often involves substantially continuous filtering of the coolant to remove potentially harmful solid particles from the circulating system. Also, such long term use often requires that the coolant be fortified with a supplemental coolant additive which is added to the coolant to import one or more beneficial properties, e.g., added corrosion inhibition, anti-foaming characteristics, etc., to the circulating coolant. Various additive compositions are disclosed in the following U.S. Pat. Nos.: 3,231,501; 3,962,109; 4,242,214; 4,455,248; 4,564,465; 4,587,028; and 4,588,513 each of which is incorporated in its entirety herein by reference.

Such supplemental coolant additive (SCA) may be added directly to the coolant in the form of a concentrated aqueous solution of the active components of the SCA. For example, diesel truck drivers may be instructed to periodically add defined amounts of such solutions to the cooling systems of their rigs. In certain systems, a solid SCA is included in a circulating coolant filter. See, for example, U.S. Pat. No. 3,645,402 which teaches a disposable-type filter for an internal combustion engine having a canister containing a corrosion inhibitor in a pallet preferably spun onto an adapter.

Using the filter to provide the SCA to the circulating coolant has substantial advantages over using concentrated SCA solutions. For example, quality control of the manufacture of the SCA/filter combinations insures that each filter has the proper amount of SCA so that the proper dosage of SCA is added to the circulating coolant.

However, manufacturing such solid SCA/filter combinations has some serious drawbacks. For example, solid SCA powders or pellets of solid SCA are inserted into the filter canister by hand. This is not only time consuming, labor intensive and costly, but it also may expose workers to potentially dangerous materials often included in the SCA. Such materials include, for example, tetraborates, alkali metal nitrites, alkali metal phosphates, heavy metals such as molybdenum, and the like. Also, the pellets must be formed in a variety of sizes to fit the various sizes of filter canisters employed. This pelleting, and in particular producing various sized pellets, is a costly operation. Preformed pellets often pick-up moisture from the atmosphere and swell to the point where they do not fit into the filter canister and must be discarded or reprocessed. This again is costly. In addition, care must be exercised to avoid any active components, e.g., liquids, which render the SCA unpelletizable. A somewhat comparable compounding limitation exists with the above-noted concentrated solutions of SCA. In this instance, only active components which are soluble in the solvent of the concentrated solution of SCA are used. These compounding limitations tend to detrimentally affect the effectiveness and/or cost of the SCA. Clearly, an improved method of manufacturing SCA/filter combinations for circulating coolant systems would be advantageous.

Therefore, one object of the present invention is to provide an improved method for manufacturing a circulating coolant system filter.

Another object of the invention is to provide a composition useful in the manufacture of a circulating coolant system filter. Other objects and advantages of the present invention will become apparent hereinafter.

An improved method for manufacturing a circulating coolant system filter has been discovered. Such filters include a filter medium and a space into which a supplemental coolant additive can be placed to provide at least one beneficial property to the circulating coolant. The present improvement comprises introducing, preferably automatically introducing, the supplemental coolant additive into the space in the form of a liquid-powdered solids slurry. As used herein, the term "automatically" refers to introducing the slurry in a substantially totally, mechanized manner which can be achieved substantially without any human being coming in contact with the slurry.

The present invention provides substantial advantages. For example, only one slurry is needed even if different sized filters are to be manufactured. In contrast, different sized solid pellets of SCA are often required to be produced for each size of filter. The slurry can be blended, shipped and stored in bulk. The slurry can be introduced into the filter space, e.g., filter canister, automatically by conventional means, such as automatic injectors and pumps. Such means can be preset to deliver the desired amount of slurry to each filter. In this manner, the amount of slurry introduced can be varied depending on the size and SCA requirements of the filter being manufactured. Such automatic introduction also reduces the exposure and physical contact of the filter manufacturing workers with the SCA, which may include one or more potentially dangerous (to human beings) components.

Substantial economies in producing the present slurries are also obtained. For example, the questions of solubility in a carrier solvent and pelletizibility are not longer factors in making up the SCA. Components which are not soluble in the liquid phase of the slurry or which are not pelletizible may be used in the presently useful SCA slurries. This provides substantial blending flexibility and potential costs reductions. To illustrate, less expensive raw materials, such as sodium salts in place of potassium salts, may be employed since carrier solubility is not a factor in the blending of the slurry.

The SCA used in the present often comprises a combination of components each of which acts to provide at least one beneficial property to the circulating coolant. For example, such SCA's often include at least one corrosion inhibitor, preferably a plurality of corrosion inhibitors, to inhibit the propensity of the circulating coolant to cause corrosion in one or more parts of the system being cooled by the coolant. More than one corrosion inhibitor is preferably included in the SCA to inhibit different types of corrosion and/or to inhibit corrosion of different materials of construction, e.g., different metals, making up the system, e.g., internal combustion engine, being cooled by the coolant. For example, a single engine may include a number of metals, such as copper, solder, brass, steel, cast iron, and cast aluminum, which are exposed to the coolant and which may require different SCA components to inhibit corrosion. The SCA may include one or more other active components, such as detergents, cleaners, chelating agents, anti-foaming agents, freezing point depressants, dyes, dye tracers and the like. Many individual SCA components and SCA blends are conventional and well known in the art and/or are commercially available. As known by one skilled in the art, care should be exercised to avoid including components in the same SCA which unduly interfere with the overall functioning of the SCA and/or which will react together to form undesirable compounds. For example, one should avoid combining nitrites with amines to avoid formation of nitrosamines, which are a potential health hazard.

Many of the patents listed above and incorporated by reference herein provide examples of SCA's useful in the present invention. Without limiting the scope of the present invention, included among the useful SCA components are alkali metal phosphates, nitrates, nitrites, molybdates, silicates, mono- and di-carboxylates, sulfonates, polyacrylates, and the like; mercaptobenzotriazole, tolytriazole, and the like; and defoamers, dyes, fluorescent agents (dye tracers) and the like. One particularly preferred SCA is sold by Fleetguard, Inc. under the tradename DCA IV.

The liquid phase of the present liquid-solid slurry may be any suitable material which is substantially compatible with the remainder of the slurry, the remainder of the filter, the circulating coolant and the system to be cooled. The liquid phase need not include any of the SCA. However, it is preferred that at least a portion of at least one of the active components, e g., corrosion inhibitors, of the SCA be present, e.g., solubilized, in the liquid phase of the slurry. The solids of the slurry also preferably include at least a portion of one of the active components, e.g., corrosion inhibitors, of the SCA. In one embodiment, the liquid phase comprises at least one freezing point depressant for the circulating coolant. For example, when the circulating coolant is aqueous based, for example, a mixture comprising water and ethylene glycol, the liquid phase of the slurry can, and preferably does, comprise ethylene glycol. In one embodiment, a major amount of the liquid in the slurry is ethylene glycol. Although the amount of ethylene glycol in the slurry is often not sufficient to depress the freezing point of the circulating coolant to the full extent desired, such ethylene glycol does depress the coolant's freezing point at least to a limited degree. More importantly, ethylene glycol in the slurry has been found to be compatible with a substantial number of SCA components, with the aqueous based coolant and with the systems that are normally cooled with such coolants.

The slurry may include a water-based liquid phase. However, it has been found that in slurries which contain non-aqueous liquid components the presence of substantial amounts of liquid water may lead to increased detrimental separation between the solids and liquid phases of the slurry. Preferably, the slurry includes less than about 15%, more preferably less than about 5%, by weight of liquid water. Particularly good results are obtained with slurries which are substantially non-aqueous, i.e., contain substantially no liquid water.

The slurry may further comprise one or more additive components in an amount effective to provide one or more beneficial properties to the slurry. For example, the slurry may contain a suspension agent, such as cellulose derivatives, other polymeric suspension agents and the like, to improve the uniformity and/or stability of the slurry and to reduce solid-liquid separation. Such suspension agents tend to increase the shelve life of the present slurries. However, it is preferred to introduce the slurry into the filter within about 2 months, more preferably within about 1 month and still more preferably within about 2 weeks, of the time the slurry is first formed to avoid undue deterioration of the slurry. The slurry is preferably substantially uniform when it is introduced into the filter. Typically, little or no agitation of the slurry is required prior to placing the slurry in the filter if such placing is performed within the times listed above. Of course, slurry agitation just prior to the slurry being introduced into the filter may be useful in any event to insure the manufacture of a quality, substantially uniform product.

The present slurries are preferably compounded of components substantially dispersible or soluble in the circulating coolant.

The relative amounts of solids and liquid in the present slurries may vary over a wide range depending, for example, on the nature of the solids and liquid being employed and the slurry properties desired. In order to maximize to effective amount of SCA per unit volume of slurry, it is preferred that the slurry contain less than about 50%, more preferably about 5% to about 40%, by weight of liquid; and more than about 50%, more preferably about 60% to about 95%, by weight of solids. An especially useful slurry contains about 10% by weight of liquid and about 90% by weight of solids.

The powdered solids useful in the present slurries have particle sizes substantially smaller than the pellets of SCA used in certain previous filter canisters. A major amount by weight, i.e., at least about 50% by weight, of the solids in the slurry have a maximum transverse dimension, i.e. diameter, of less than about 500 microns. More preferably, substantially all of the solids in the slurry are present in particles having diameters of less than about 250 microns.

The present slurries can be prepared by periodically over time adding relatively small increments of the desired powdered solids to the desired liquid. Alternately, substantially continuous addition of the solids to the liquid may be employed. This addition is accompanied by mixing, e.g., using a mechanical mixer, to provide a substantially uniform blend. The addition continues until the desired composition is obtained.

After the desired amount of slurry is introduced into the filter, the slurry may separate into liquid and solid phases, or may form a substantially solid mass. In any event the SCA/filter combination may be stored for a substantial period of time prior to use with little or no detrimental effect on the SCA.

The SCA/filter combination may be used by placing it in fluid communication with the circulating coolant. Such filter combinations are disclosed in U.S. Pat. No. 3,645,402 which is incorporated herein in its entirety by reference. In any event, once such fluid communication is established, the SCA preferably disperses or solubilizes in the circulating coolant. The filter medium effectively removes solid particles from the circulating coolant. After a period of time, the SCA/filter combination is replaced with a new SCA/filter combination and this is continued on a periodic basis. Of course, after a certain interval of time, the coolant itself is replaced.

The present slurries can also be used for addition directly into the circulating coolant, e.g., in much the same way as operators, such as truck drivers, periodically add additive solutions to circulating coolants. However, the present slurries find their greatest and most advantageous application in the manufacture of SCA/filter combinations.

The following examples illustrate certain embodiments of the present invention and are not to be construed to limit the scope of the invention.

EXAMPLES 1 TO 24

A series of liquid-solid slurries was prepared from the following components:

| Component | Description |
| --- | --- |
| A | An SCA in powdered form having a composition similar to DCA-IV, a SCA sold comercially by Fleetguard, Inc. and included in coolant SCA/filter combinations sold by is Fleetguard, Inc. This powder substantially free of uncombined (liquid) water. |
| B | Ethylene glycol |
| C | Suspension Agent |
| D | A liquid corrosion inhibitor proprietary to Fleetguard, Inc. |
| E | Liquid water |

Each of the slurries were produced by combining the liquids and then slowly adding the solid materials with continuous mechanical mixing. These slurries had the following compositions.

| EXAMPLE | COMPONENT, WT. % | | | | |
| --- | --- | --- | --- | --- | --- |
|  | A | B | C | D | E |
| 1 | 76 | 24 | | | |
| 2 | 75 | 25 | | | |
| 3 | 74 | 26 | | | |
| 4 | 73 | 27 | | | |
| 5 | 77 | 23 | | | |
| 6 | 73 | 26 | 1 | | |
| 7 | 74 | 25 | 1 | | |
| 8 | 71 | 28 | 1 | | |
| 9 | 73.0 | 26.5 | 0.5 | | |
| 10 | 73.25 | 26.75 | | | |
| 11 | 73.0 | 25.0 | 0.5 | 1.5 | |
| 12 | 70.5 | 29.0 | 0.5 | | |
| 13 | 70.75 | 29.25 | | | |
| 14 | 70.75 | 28.25 | | 1 | |
| 15 | 69.5 | 30.0 | 0.5 | | |
| 16 | 69.5 | 30.5 | | | |
| 17 | 68.5 | 31 | 0.5 | | |
| 18 | 67.5 | 32 | 0.5 | | |
| 19 | 66.5 | 33 | 0.5 | | |
| 20 | 65.5 | 34 | 0.5 | | |
| 21 | 64.5 | 35 | 0.5 | | |
| 22 | 67 | 27 | | 1 | 5 |
| 23 | 67 | 22 | | 1 | 10 |
| 24 | 67 | 17 | | 1 | 15 |

Each of these slurries was exposed to ambient conditions, with no additional mechanical mixing, for a period of time and observed. A summary of such observations is as follows:

Examples 1 to 8—The slurries expanded slightly overnight, possibly due to gassing. Component C appeared to help initially suspend the solids in the liquid, but did not cause solidification of the slurry overnight. Component C also helped to prevent migration of ingredients overnight and aided in keeping a uniform texture from top to bottom of the slurries. Each of the slurries did get thicker overnight. Slurry 6 had good softness and uniformity after about 16 hours. After about 9 days exposure, Slurries 1, 2. 3. 6, and 7 had become hard or stiff so that, for practical purposes, the slurry would not flow. Slurry 8 was softer, but flowed slowly.

After about 5 days exposure, observations on Slurries 9 to 21 were as follows. Slurries 9, 10, 11, and 12 were stiff or very stiff and exhibited low flow characteristics. Slurry 17 was moderately stiff. Slurries 13, 14, 15, 16, and 18 each had good body and exhibited good flow characteristics. Slurries 19, 20, and 21 were very liquid with some phase separation apparent.

After about 9 days exposure, observations on Slurries 9 to 21 were as follows. Slurries 9, 10, and 12 were very moist to the touch and exhibited low or slow flow characteristics. Slurry 11 was stiff. Slurries 13, 14, and 15 were very moist to the touch and exhibited moderate to good flow characteristics. Slurry 13 had some non-uniformity or migration of the solid particles. Slurries 16 to 21 exhibited good to very good flow characteristics, but some non-uniformity, e.g., particle migration, phase separation and/or lumpiness, was apparent in each of these slurries, possibly due to non-uniform solid particles.

These results and observations indicate that a liquid/solid slurry containing SCA with a useful shelf life can be prepared. Some experimentation may be useful in choosing the relative amounts of liquid and solid and the particle size of the solid depending, for example, on the specific liquid and solids to be included in the slurry and the desired shelf life of the slurry. Further, it should be noted that the body and flow properties of the slurry can be restored at least to some extent by periodic mixing, e.g., at the filter manufacturer's location. However, it is preferred that the slurry have sufficient stability so that substantially no mixing is required from the time the slurry is prepared to the time it is introduced into the filter.

Slurries 22, 23, and 24 were prepared and observed to determine the effect of liquid water on the slurry. Slurry 20, as prepared, was lumpy and some migration of particles was apparent. Slurry 23 and 24 showed progressively less lumps but more severe separation. The observations indicate that the presence of liquid water appears to be detrimental to the stability of the slurry.

EXAMPLE 25

Another slurry was prepared as described above containing 67% by weight of component A; 32% by weight of Component B and 1% by weight of Component D. After 4 days of exposure to ambient temperature, this slurry exhibited very good flow characteristics with a low degree of particle migration. This slurry is useful in manufacturing filter/SCA combinations. If the solids are milled prior to the slurry being prepared to obtain more uniform particle size, more solids, relative to liquid, can be added to the slurry. Since this is often advantageous, it is preferred to subject the solids to processing, more preferably prior to the formation of the liquid-solid slurry, effective to provide more uniformly sized solid particles, i.e., relative to the solid particles prior to such processing.

EXAMPLES 26 TO 30

A further series of slurries was prepared as described above, except that the solid particles were milled and recovered so that the solid particles used in the slurry had a more uniform size distribution relative to the unmilled solid particles. The composition of each of the slurries were as follows:

| EXAMPLE | COMPONENT, WT. % | | | | |
|---|---|---|---|---|---|
| | A | B | C | D | E |
| 26 | 70 | 29 | 1 | | |
| 27 | 71 | 28 | | | 1 |
| 28 | 72 | 27 | | | 1 |
| 29 | 73 | 26 | | | 1 |
| 30 | 74 | 25 | | | 1 |

Each of these slurries exhibited sufficient stability, shelve life and flow characteristics to be useful in the manufacture of filter/SCA combinations.

EXAMPLES 31 TO 35

Each of the slurries identified in Examples 26 to 30 is shipped in bulk to a manufacturer of conventional filter/SCA combinations. Within two weeks, each of these slurries is introduced into variously sized filters using automatic injection equipment effective to dispense a preset amount of slurry into each filter. No human at the filter manufacturer's location needs to come in direct contact with the slurry, and no substantial mixing of the slurry by the filter manufacturer is required. These filter/SCA combinations are placed in use in fluid communication with circulating coolants in appropriately and differently sized vehicular diesel engines. These filter/SCA combinations are effective to provide SCA to the circulating coolants and to filter solid particles from the circulating coolant.

While this invention has been disclosed with respect to various specific examples and embodiments, it is to be understood that the invention is not limited thereto and can be variously protected within the scope of the following claims.

The embodiments of the present invention in which an exclusive property or privilege is claimed are as follows:

1. A coolant additive which is a liquid-solids slurry comprising less than 50% by weight of liquid and more than 50% by weight of solid particles of a combination of solid supplemental coolant additive components each of which components provides at least one beneficial property to the circulating coolant of an internal combustion engine when added to the circulating coolant of an internal combustion engine, said solid supplemental coolant additive components being selected from the group consisting of corrosion inhibitors, chelating agents, anti-foaming agents, dyes, dye tracers and mixtures thereof, provided said slurry contains at least one corrosion inhibitor and substantially no liquid water.

2. The liquid-solids slurry of claim 1 wherein said liquid is present in an amount in the range of about 5% to about 40% by weight of said slurry and said solid particles are present in an amount in the range of about 60% to about 95% by weight of said slurry.

3. The liquid-solid slurry of claim 1 wherein said liquid is present in an amount of about 10% by weight of said slurry and said solid particles are present in an amount of about 90% of said slurry.

4. The liquid-solids slurry of claim 1 which consists essentially of said liquid and said solid particles.

5. The liquid-solids slurry of claim 1 wherein a major amount of said solid particles have a diameter of less than about 500 microns.

6. The liquid-solids slurry of claim 1 wherein said solid supplemental coolant additive components are selected from the group consisting of corrosion inhibitors.

7. The liquid-solids slurry of claim 1 wherein said liquid includes ethylene glycol.

8. The liquid-solids slurry of claim 1 wherein a major amount of said liquid is ethylene glycol.

* * * * *

UNITED STATES PATENT AND TRADEMARK OFFICE
CERTIFICATE OF CORRECTION

PATENT NO.   :   4,980,075
DATED        :   December 25, 1990
INVENTOR(S)  :   Dobrez et al It is certified that error appears in the above-identified patent and that said Letters Patent is hereby corrected as shown below:

Column 1, line 21; delete "engines" and insert in place thereof --engines,--

Column 1, line 28; delete "import" and insert in place thereof --impart--

Column 2, line 57; delete "costs" and insert in place thereof --cost--

Column 2, line 61; after the word "present" insert --slurries--

Column 7, delete lines 15 to 20 and insert in place thereof --

| EXAMPLE | COMPONENT, WT. % | | | | |
|---------|------|------|---|---|---|
|         | A    | B    | C | D | E |
| 26      | 70   | 29   |   | 1 |   |
| 27      | 71   | 28   |   | 1 |   |
| 28      | 72   | 27   |   | 1 |   |
| 29      | 73   | 26   |   | 1 |   |
| 30      | 74   | 25   |   | 1 |   |

--

Column 7, line 12; delete "were" and insert in place thereof --was--

Column 8, line 2; delete "protected" and insert in place thereof --practiced--

Signed and Sealed this

Twenty-first Day of April, 1992

Attest:

HARRY F. MANBECK, JR.

Attesting Officer    Commissioner of Patents and Trademarks